US008803897B2

(12) United States Patent
Sadowski et al.

(10) Patent No.: US 8,803,897 B2
(45) Date of Patent: Aug. 12, 2014

(54) INTERNAL, PROCESSING-UNIT MEMORY FOR GENERAL-PURPOSE USE

(75) Inventors: Greg Sadowski, Cambridge, MA (US); Konstantine Iourcha, San Jose, CA (US); John Brothers, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 440 days.

(21) Appl. No.: 12/616,636

(22) Filed: Nov. 11, 2009

(65) Prior Publication Data

US 2011/0050710 A1 Mar. 3, 2011

Related U.S. Application Data (60) Provisional application No. 61/239,730, filed on Sep. 3, 2009.

(51) Int. Cl.
*G06F 13/00* (2006.01)
(52) U.S. Cl.
USPC .......................................... 345/537; 345/532
(58) Field of Classification Search
USPC ................... 345/537, 502; 711/130; 257/686; 703/13
See application file for complete search history.

(56) References Cited

U.S. PATENT DOCUMENTS

| | | | |
|---|---|---|---|
| 6,956,579 B1 * | 10/2005 | Diard et al. ................... | 345/537 |
| 7,619,629 B1 * | 11/2009 | Danilak ......................... | 345/502 |
| 7,769,602 B2 | 8/2010 | Motoki | |
| 7,921,365 B2 | 4/2011 | Sauve et al. | |
| 2004/0160449 A1 | 8/2004 | Gossalia et al. | |
| 2007/0074221 A1 | 3/2007 | Stenson et al. | |
| 2007/0098080 A1 * | 5/2007 | Diard et al. ............... | 375/240.25 |
| 2007/0294696 A1 | 12/2007 | Papakipos et al. | |
| 2008/0111225 A1 * | 5/2008 | Kim et al. ...................... | 257/686 |
| 2008/0183971 A1 * | 7/2008 | Anand et al. .................. | 711/141 |
| 2009/0077320 A1 * | 3/2009 | Hoover et al. ................ | 711/130 |
| 2009/0125290 A1 * | 5/2009 | Chatterjee et al. .............. | 703/13 |
| 2009/0138658 A1 * | 5/2009 | Dreslinski et al. ............. | 711/118 |
| 2009/0164736 A1 * | 6/2009 | Dorsey et al. ................. | 711/141 |
| 2009/0193197 A1 * | 7/2009 | Stevens et al. ................ | 711/141 |
| 2010/0014103 A1 | 1/2010 | Lee et al. | |

FOREIGN PATENT DOCUMENTS

EP   0 442 041 A2   8/1991
EP   1 557 755 A1   7/2005

OTHER PUBLICATIONS

International Search Report and Written Opinion for International Application No. PCT/US2010/047784, mailed on Nov. 29, 2010, 11 pages.

* cited by examiner

*Primary Examiner* — Phi Hoang
(74) *Attorney, Agent, or Firm* — Sterne, Kessler, Goldstein & Fox P.L.L.C.

(57) ABSTRACT

Disclosed herein is a graphics-processing unit (GPU) having an internal memory for general-purpose use and applications thereof. Such a GPU includes a first internal memory, an execution unit coupled to the first internal memory, and an interface configured to couple the first internal memory to a second internal memory of an other processing unit. The first internal memory may comprise a stacked dynamic random access memory (DRAM) or an embedded DRAM. The interface may be further configured to couple the first internal memory to a display device. The GPU may also include another interface configured to couple the first internal memory to a central processing unit. In addition, the GPU may be embodied in software and/or included in a computing system.

25 Claims, 5 Drawing Sheets

INTERNAL, PROCESSING-UNIT MEMORY FOR GENERAL-PURPOSE USE

CROSS REFERENCE TO RELATED APPLICATIONS

This application claims benefit under 35 U.S.C. §119(e) to U.S. Provisional Patent Application 61/239,730, entitled "An Internal, Processing-Unit Memory for General-Purpose Use," to SADOWSKI et al, filed on Sep. 3, 2009, the entirety of which is hereby incorporated by reference as if fully set forth herein.

BACKGROUND OF THE INVENTION

1. Field of the Invention

The present invention is generally directed to computing devices (e.g., computers, embedded devices, hand-held devices, and the like). More particularly, the present invention is directed to memory used by processing units of such computing devices.

2. Background Art

A computing device typically includes one or more processing units, such as a central-processing unit (CPU) and a graphics-processing unit (GPU). The CPU coordinates the activities of the computing device by following a precise set of instructions. The GPU assists the CPU by performing data-parallel computing tasks, such as graphics-processing tasks and/or physics simulations which may be required by an end-user application (e.g., a video-game application). The GPU and CPU may be part of separate devices and/or packages or may be included in the same device and/or package. Further, each processing unit may be included in another larger device. For example, GPUs are frequently integrated into routing or bridge devices such as, for example, Northbridge devices.

There are several layers of software between the end-user application and the GPU. The end-user application communicates with an application-programming interface (API). An API allows the end-user application to output graphics data and commands in a standardized format, rather than in a format that is dependent on the GPU. Several types of APIs are commercially available—including DirectX® developed by Microsoft Corporation of Redmond, Wash.; OpenGL® and OpenCL maintained by Khronos Group. The API communicates with a driver. The driver translates standard code received from the API into a native format of instructions understood by the GPU. The driver is typically written by the manufacturer of the GPU. The GPU then executes the instructions from the driver.

In a conventional system, the CPU and GPU are each typically coupled to an external memory. The external memory may include instructions to be executed and/or data to be used by the CPU and/or GPU. The external memory may be, for example, a dynamic random-access memory (DRAM). The external memory can be configured to be quite large, thereby providing ample storage capacity to each processing unit to which it's coupled. Unfortunately, accessing the external memory may take several hundred clock cycles. Accordingly, an external memory may not provide memory sufficient bandwidth or fast memory access for high-end GPUs.

One potential solution for providing sufficient memory bandwidth to a GPU is to provide the GPU with an internal memory. The internal memory may be, for example, an embedded or stacked DRAM. Compared to external memory, an internal memory provides higher bandwidth, faster memory access, and consumes less power. However, the capacity of the internal memory cannot easily be scaled to meet the storage demands of high-end GPUs. For example, a high-end GPU may require more memory than can be included in an internal memory of the GPU.

Given the foregoing, what is needed is memory, and applications thereof, that provide both sufficient memory capacity (like external memory) and high bandwidth (like embedded memory).

BRIEF SUMMARY OF EMBODIMENTS OF THE INVENTION

Embodiments of the present invention meets the above-described needs by providing an internal, processing-unit memory for general-purpose use and applications thereof. The internal, processing-unit memory of embodiments of the present invention provides high bandwidth because it is embedded within a processing unit. It also provides sufficient storage capacity because a plurality of processing-unit memories may be combined into a sufficiently large memory pool.

For example, an embodiment of the present invention provides a GPU. The GPU includes a first internal memory, an execution unit coupled to the first internal memory, and an interface configured to couple the first internal memory to a second internal memory of another processing unit. In an embodiment, the GPU is embodied in software. In another embodiment, the GPU is included in a system. The system may comprise, for example, a supercomputer, a desktop computer, a laptop computer, a video-game console, an embedded device, a handheld device (e.g., a mobile telephone, smart phone, MP3 player, a camera, a GPS device, or the like), or another system that includes or is configured to include a GPU.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth

DETAILED DESCRIPTION OF EMBODIMENTS OF THE INVENTION

I. Overview

The present invention provides an internal, GPU memory for general-purpose use and applications thereof. In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In accordance with an embodiment, a GPU includes an internal memory (e.g., an embedded or stacked DRAM) that is configured to be used by one or more other processing units. The GPU includes an interface and implements a protocol, allowing the one or more other GPUs access to its internal memory. The interface may provide each other GPUs dedicated access to the internal memory or may provide the other GPUs shared access to the internal memory. Access to the internal memory of the GPU may be controlled by the GPU itself or each other GPUs.

In an embodiment, the interface and protocol allows the internal memory to be combined with external memories, forming a larger memory pool accessible to the GPU. The external memories may be included in other GPUs. In an embodiment, for example, a computing device includes a plurality of GPUs, wherein each GPU includes an internal memory that is configured to be shared with the other GPUs. In this embodiment, the internal memory of each GPU is combined into a unified memory pool. The size of the memory pool scales with the number of participating GPUs. Any participating GPU may use the memory pool for its storage needs.

Further details of an example GPU in accordance with an embodiment of the present invention are described below. Before providing these details, however, it is helpful to describe an example computing device in which such GPUs may be implemented.

II. An Example Computing System

Figure 1A:
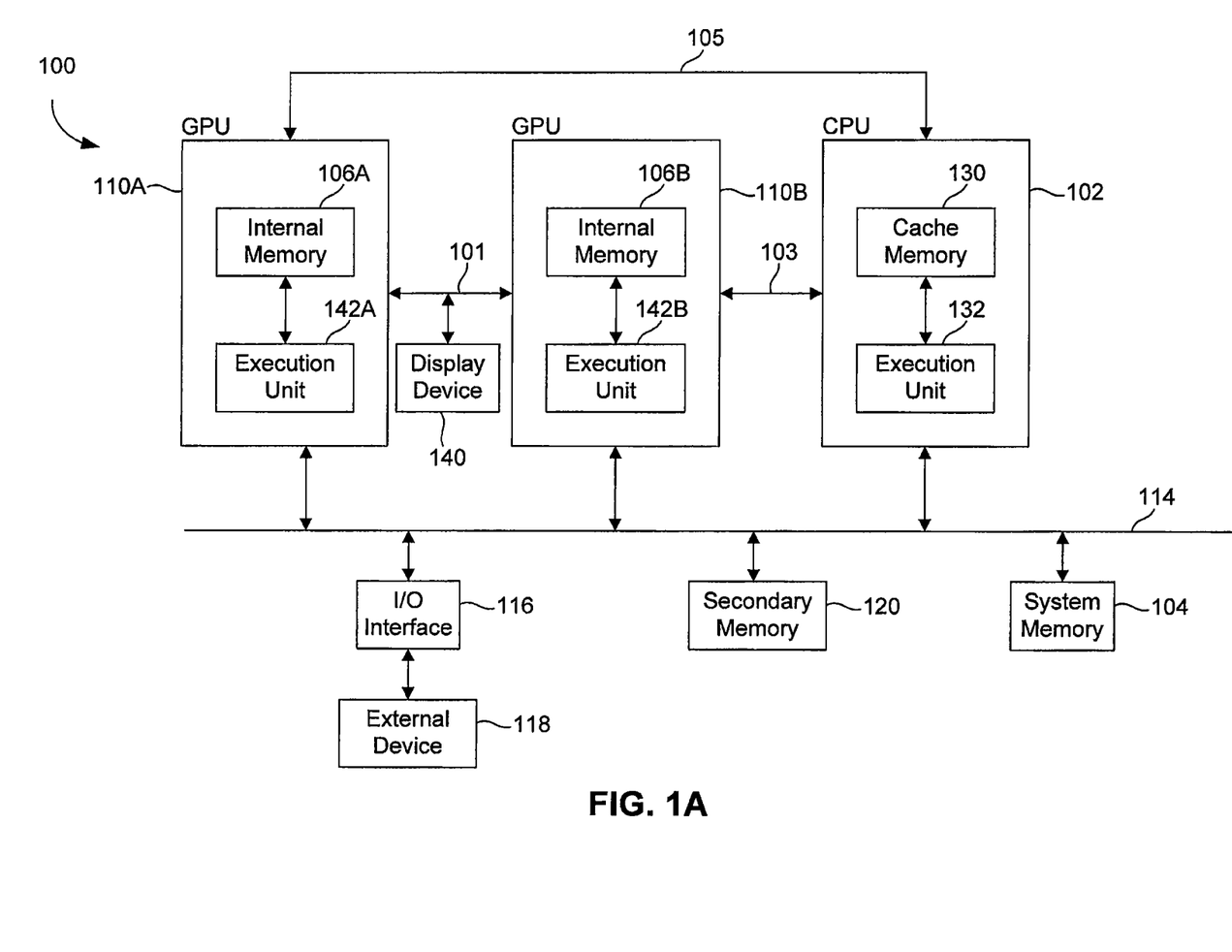
FIGS. 1A and 1B illustrate example systems that include internal, processing-unit memories for general-purpose use in accordance with an embodiment of the present invention.
Figure 1B:
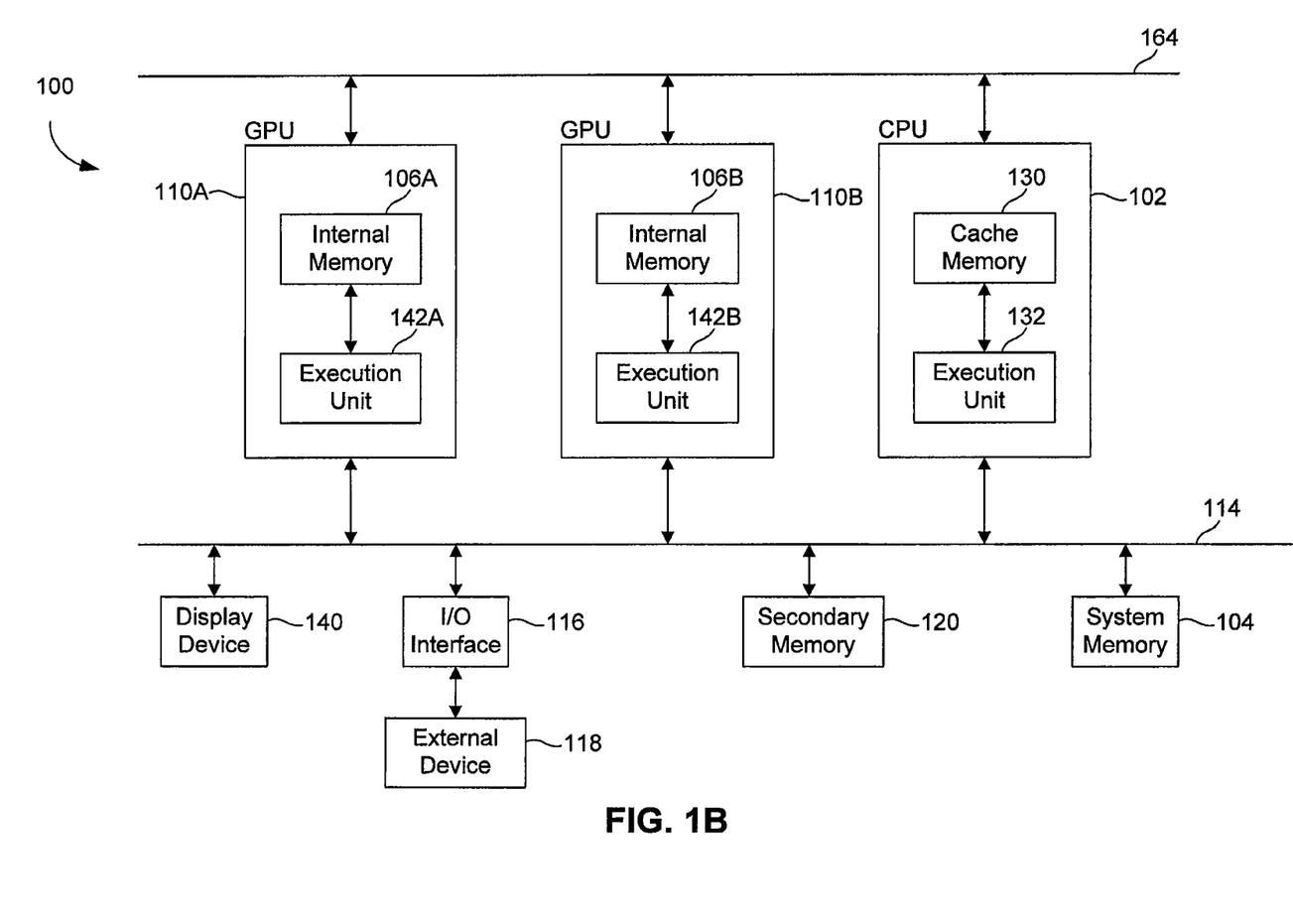

FIGS. 1A and 1B illustrate an example computing system 100 having a plurality of GPUs, each including an internal memory configured for general-purpose use in accordance with embodiments of the present invention. Compared to external memories, the internal memories provide each GPU higher bandwidth access to data. In addition, the internal memories of each GPU can be combined into a larger memory pool accessible by each GPU, thereby providing sufficient storage capacity to each GPU.

In the embodiment of FIG. 1A, each GPU is given dedicated access to the internal memory of another GPU. In the embodiment of FIG. 1B, each GPU has shared access to the internal memories of the other GPU via a shared interface. In embodiments, computing system 100 may comprise a supercomputer, a desktop computer, a laptop computer, a video-game console, an embedded device, a handheld device (e.g., a mobile telephone, smart phone, MP3 player, a camera, a GPS device, or the like), or some other device that includes or is configured to include a CPU and/or GPU.

Referring to FIGS. 1A and 1B, computing device 100 includes a CPU 102, a first GPU 110A, and a second GPU 110B. CPU 102 executes instructions to control the functionality of computing device 100. GPUs 110 assist CPU 102 by performing data-parallel processing tasks (such as, for example, graphics-processing tasks and/or general-compute tasks). Based on their design, GPUs 110 can typically perform data-parallel processing tasks faster than CPU 102 could perform them in software.

First GPU 110A and second GPU 110B each include their own internal memory and execution unit. Specifically, first GPU 106A includes an internal memory 106A and an execution unit 142A; and second GPU 106B includes an internal memory 106B and an execution unit 142B. Similarly, CPU 102 includes a cache memory 130 and an execution unit 132. Internal memories 106 (and optionally cache memory 130) are available to GPUs 110 to provide faster access and higher bandwidth to certain data than would be possible if the data were externally stored (e.g., if the data were stored in a system memory 104). The internal memories 106 may comprise, for example, embedded or stacked DRAM.

Internal memories 106A, 106B (and optionally cache memory 130) may be combined into a larger memory pool to provide substantial storage capacity (e.g., more than 4 GB), while also providing fast, high bandwidth memory access. Although conventional external memories may provide sufficient storage capacity (e.g., more than 4 GB), conventional external memories provide insufficient bandwidth for certain high-end uses. Similarly, although conventional embedded memories may provide sufficient bandwidth for these high-end uses, conventional embedded memories provide insufficient storage capacity (e.g., fewer than 4 GB) for these high-end uses. Unlike conventional external memories and/or conventional embedded memories, embodiments of the present invention not only provide sufficient storage capacity (e.g., more than 4 GB), but also provide high bandwidth by providing GPUs that include internal memories which are available to other GPUs for general-purpose use.

For example, a frame buffer (i.e., a buffer that stores a complete frame of data to be displayed on a display device) of a high-end GPU may require high bandwidth access to a substantially large memory (e.g., more than 4 gigabytes (GB)). In embodiments, first GPU 110A may use internal memories 106A, B and optionally cache memory 130 of CPU 102 to define the frame buffer of first GPU 110A. Similarly, second GPU 110B may also use internal memories 106A, B and optionally cache memory 130 of CPU 102 to define the frame buffer of second GPU 110B. In this way, unlike conventional external or embedded memories, the frame buffer defined in accordance with embodiments of the present invention provides high bandwidth access to a substantially large memory (e.g., more than 4 GB).

In the embodiment of FIG. 1A, each GPU 110 is given dedicated access to internal memory 106 of another processing unit, as alluded to above. Specifically, a first interface 101 provides first GPU 110A dedicated access to internal memory 106B of second GPU 110B and provides second GPU 110B dedicated access to internal memory 106A of first GPU 110A. Data may be written to or retrieved from either internal memory 106A or internal memory 106B based on an address range of the data. For example, internal memory 106A may be assigned a first address range (e.g., less than a first predetermined address A and greater than or equal to a second predetermined address B), and internal memory 106B may be assigned a second address range (e.g., all addresses not within the first address range). It is to be appreciated, however, that other schemes for writing data to and retrieving data from internal memory 106A and/or internal memory 106B may be implemented without deviating from the spirit and scope of the present invention, provided first GPU 110A and second GPU 110B can each have access to internal memory 106A of first GPU 110A and internal memory 106B of second GPU 110B.

In an embodiment, first interface 101 comprises a display controller interface. The display controller interface provides a display device 140 access to the frame buffer of a GPU. By incorporating the display controller interface into first interface 101, first interface 101 can be provided on a standard pin that is already included in conventional GPU designs.

In addition to first interface 101, a second interface 103 provides CPU 102 dedicated access to internal memory 106B of second GPU 110B and provides second GPU 110B dedicated access to cache memory 130 of CPU 102. In this way, second GPU 110B and CPU 102 can each have access to internal memory 106B of second GPU 110B and cache memory 130 of CPU 102. Likewise, a third interface 105 provides first GPU 110A dedicated access to cache memory 130 of CPU 102 and provides CPU 102 dedicated access to internal memory 106A of first GPU 110A. In this way, first GPU 110A and CPU 102 can each have access to internal memory 106A of first GPU 110A and cache memory 130 of CPU 102.

In the embodiment of FIG. 1B, each processing unit has shared access to the internal memories of the other processing units via a shared interface 164. Shared interface 164 provides each processing unit (e.g., first GPU 110A, second GPU 110B, and CPU 102) high bandwidth access to the internal memory of the other processing units. Data may be written to or retrieved from internal memory 106A, internal memory 106B, or cache memory 130 based on an address range of the data. For example, internal memory 106A may be assigned a first address range; internal memory 106B may be assigned a second address range; and cache memory 130 may be assigned a third address range. It is to be appreciated, however, that other schemes for writing data to and retrieving data from internal memory 106A, internal memory 106B, and/or cache memory 130 may be implemented without deviating from the spirit and scope of the present invention, provided first GPU 110A, second GPU 110B, and CPU 102 can each have access to internal memory 106A of first GPU 110A, internal memory 106B of second GPU 110B, and cache memory 130 of CPU 102.

In embodiments, computing device 100 also includes a system memory 104, a secondary memory 120, an input-output (I/O) interface 116, and/or display device 140. System memory 104 stores information that is frequently accessed by programs running on CPU 102. System memory 104 typically comprises volatile memory, meaning that data stored in system memory 104 are lost when power to computing device 100 is turned off. Secondary memory 120 stores data and/or applications used by computing device 100. Secondary memory 120 typically has much larger storage capacity compared to system memory 104 and typically comprises non-volatile (persistent) memory, meaning that data stored in secondary memory 120 persists even when power to computing device 100 is turned off. I/O interface 116 allows computing device 100 to be coupled an external device 116 (such as, an external display device, an external storage device (e.g., video-game cartridge, CD, DVD, flash drive, or the like), a network card, or some other type of external device). Display device 140 displays content of computing device 100. Display device may comprise a cathode ray tube, a liquid-crystal display (LCD), a plasma screen, or some other type of display device whether now known or later developed.

GPUs 110 and CPU 102 communicate with each other and system memory 104, secondary memory 120, and I/O interface 116 over a bus 114. Bus 114 may be any type of bus used in computing devices, including a peripheral component interface (PCI) bus, an accelerated graphics port (AGP) bus, a PCI Express (PCIE) bus, or another type of bus whether presently available or developed in the future.

In embodiments, computing device 100 may include a video processing unit (VPU) in lieu of or in addition to GPU 110. For example, in an embodiment, computing device 100 includes GPU 110A, CPU 102; and in lieu of GPU, 110B illustrated in FIGS. 1A and 1B, computing device 100 includes a VPU. In this way, CPU 102 can perform general processing functions, GPU 110A can perform graphics-processing functions, and the VPU can perform video-processing functions.

III. An Example GPU

Figure 2:
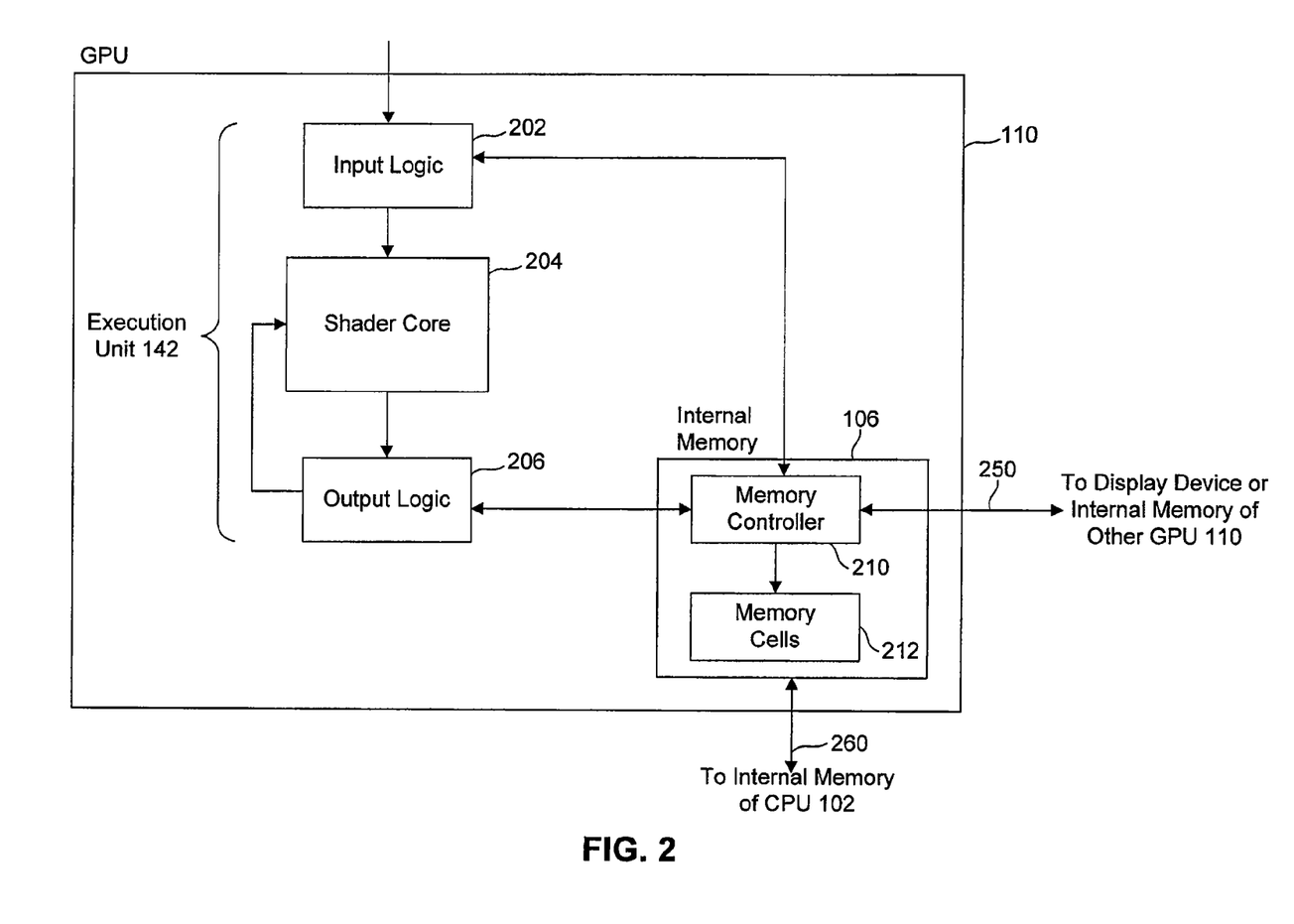
FIG. 2 illustrates details of an example GPU having an internal memory for general-purpose use in accordance with an embodiment of the present invention.

FIG. 2 illustrates example details of GPU 110 having an internal memory 106. In accordance with an embodiment of the present invention, internal memory 106 can be used by another GPU, or a CPU, to increase overall system performance by combining the graphics processing power based on an augmented memory footprint size.

As mentioned above, GPU 110 includes execution unit 142 and internal memory 106. Referring to FIG. 2, execution unit 142 includes input logic 202, a shader core 204, and output logic 206. Internal memory 106 includes a memory controller 210 and memory cells 212. Memory controller 210 controls access to memory cells 212. Memory cells 212 store data.

Figure 3:
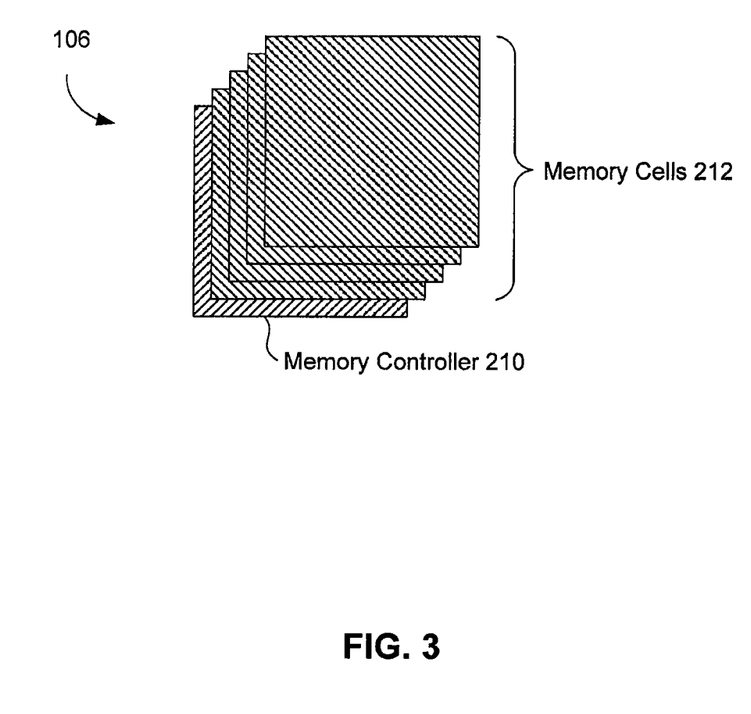
FIG. 3 illustrates an example stacked memory that may be included in a processing element in accordance with an embodiment of the present invention.

In an embodiment, internal memory 106 comprises an embedded, dynamic random access memory (DRAM). An embedded DRAM is a memory encapsulated in a common package with a processing unit. In another embodiment, internal memory 106 comprises a stacked DRAM, as illustrated in FIG. 3. A stacked memory includes a plurality of memory elements stacked on top of each other in a three-dimensional structure.

Internal memory 106 is coupled to execution unit 142 via both input logic 202 and output logic 206. In particular, input logic 202 can retrieve data from internal memory 106, and output logic 206 can send data to internal memory 106 to be stored in memory cells 212.

Internal memory 106 may also be coupled to the internal memory of another GPU via a first interface 250. Coupling internal memory 106 to the internal memory of another GPU can increase the total memory pool available to execution unit 142. In an embodiment, first interface 250 provides dedicated access between internal memory 106 of GPU 110 and an internal memory of another GPU, as illustrated by interface 101 of FIG. 1A. In this embodiment, first interface 250 is a provided on a standard pin of a conventional GPU. For example, first interface 250 may comprise a display-controller interface, which provides a display device access to a local frame buffer included in internal memory 106. In another embodiment, first interface 250 provides shared access between internal memory 106 of GPU 110 and internal memories of other processing units, as illustrated by interface 164 of FIG. 1B.

Internal memory 106 may also be coupled to cache memory 130 of CPU 102 via a second interface 260. Accordingly, the combination of internal memory 106 and cache memory 130 can increase the memory pool available to GPU 110. In an embodiment, second interface 260 provides a dedicated connection between internal memory 106 of GPU 110 and cache memory 130 of CPU 102, such as connection 103 or connection 105 of FIG. 1A. In another embodiment, second interface 260 provides a connection that is shared by only GPU 110 and CPU 102, such as connection 164 of FIG. 1B. In a further embodiment, second interface couples GPU 110 to CPU 102 on a common bus, such as bus 114 of FIGS. 1A and 1B.

IV. Example Operation of GPU 110

Figure 4:
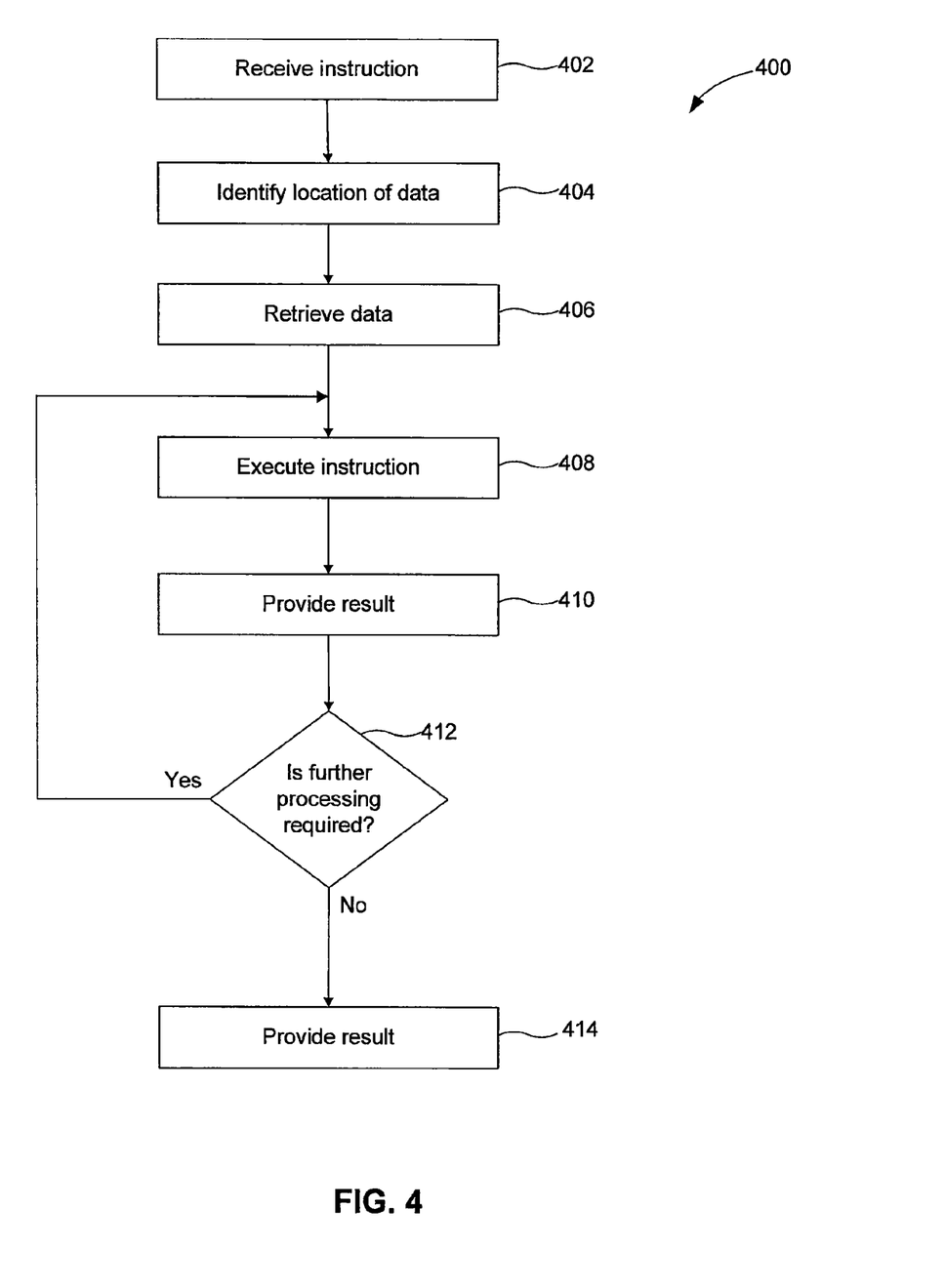
FIG. 4 illustrates an example method implemented by the GPU of FIG. 2 in accordance with an embodiment of the present invention.

FIG. 4 illustrates an example method 400 implemented by GPU 110 in accordance with an embodiment of the present invention. Method 400 is described below with reference to FIGS. 3 and 4.

Method 400 begins at a step 402 in which instruction are received. In an embodiment, input logic 202 receives instructions to be executed by GPU 110. The instructions may comprise, for example, a graphics-processing task or a data-parallel processing task provided by an end-user application running on CPU 102 of system 100.

In a step 404, a location of data associated with an instruction is identified. In one example, the data may be included with a received instruction. Such data is commonly referred to as immediate data. In another example, the instruction provides the location of the data. For instance, the instruction may include an address within which the data is stored. In a further example, the instruction includes information from which input logic 202 computes the address within which the data is stored. The data may be stored in either internal memory 106, an internal memory of another GPU to which internal memory 106 is coupled, or cache memory 130 of CPU 102.

In a step 406, the data is retrieved. If the data is immediate data, input logic 202 simply extracts the immediate data from the instruction. If the data is stored in internal memory 106 or a memory to which internal memory 106 is coupled, input logic 202 sends a request to memory controller 210 for access to the data. If, on the one hand, the data is stored in memory cells 212, the data is retrieved and provided to input logic 202. If, on the other hand, the data is stored in another memory coupled to internal memory 106, the request from input logic 202 is forwarded to the other memory via interface 250 or interface 260. The data is then retrieved from the other memory and provided to input logic 202.

In a step 408, the instruction is executed. Shader core 204 executes the instruction based on the data obtained by input logic 202 in step 406.

In a step 410, results of the instruction execution are provided to output logic 206. Output logic 206 determines whether further processing is required on these results, as indicated in decision step 412. Results provides to output logic 206 may have a flag or some other indicia to indicate whether additional processing is necessary. If in decision step 412 output logic 206 determines that further processing is necessary, then output logic 206 forwards the results back to shader core 204 and steps 408 and 410 of method 400 are repeated. If, on the other hand, output logic 206 determines, in decision step 412, that no further processing is necessary, then output logic 206 provides the results to internal memory 106, as indicated in step 414.

The results may then be written to internal memory 106 or to a memory coupled to internal memory 106, depending on the address to which the results are to be written. If the results are to be written to internal memory 106, memory controller 210 provides access to the appropriate address in memory cells 212 and the results are stored therein. If, on the other hand, the results are to be written to a memory coupled to internal memory 106, then memory controller 210 forwards the results to the other memory via interface 250 or interface 260 and the results are stored in memory cells of the other memory.

V. Example Software Implementations

In addition to hardware implementations of GPU 110, such GPUs may also be embodied in software disposed, for example, in a computer-readable medium configured to store the software (e.g., a computer-readable program code). The computer-readable program code enables embodiments of the present invention, including the following embodiments: (i) the functions of the systems and techniques disclosed herein (such as, providing tasks to GPU 110, scheduling tasks in GPU 110, executing tasks in GPU 110, or the like); (ii) the fabrication of the systems and techniques disclosed herein (such as, the fabrication of GPU 110); or (iii) a combination of the functions and fabrication of the systems and techniques disclosed herein.

This can be accomplished, for example, through the use of general-programming languages (such as C or C++), hardware-description languages (HDL) including Verilog HDL, VHDL, Altera HDL (AHDL) and so on, or other available programming and/or schematic-capture tools (such as circuit-capture tools). The computer-readable program code can be disposed in any known computer-readable medium including semiconductor, magnetic disk, or optical disk (such as CD-ROM, DVD-ROM). As such, the computer-readable program code can be transmitted over communication networks including the Internet and internets. It is understood that the functions accomplished and/or structure provided by the systems and techniques described above can be represented in a core (such as a shader core) that is embodied in computer-readable program code and may be transformed to hardware as part of the production of integrated circuits.

VI. Conclusion

Described above is an internal, GPU memory for general-purpose use and applications thereof. It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A graphics processing unit (GPU), comprising:
   a first internal memory comprising a memory controller and memory cells;
   an execution unit coupled to the first internal memory, wherein the execution unit and the first internal memory are on a same die; and
   an interface configured to provide high bandwidth dedicated internal memory access to a second internal memory of an additional processing unit, and further configured to provide high bandwidth dedicated internal memory access to the first internal memory by the additional processing unit, the first internal memory being combinable with the second internal memory for general-purpose use by the additional processing unit.

2. The processing unit of claim 1, wherein the additional processing unit comprises a CPU.

3. The processing unit of claim 1, wherein the additional processing unit comprises a central processing unit (CPU) and the second internal memory is a cache memory.

4. The processing unit of claim 1, wherein the first internal memory comprises a stacked dynamic random-access memory.

5. The processing unit of claim 1, wherein the first internal memory comprises an embedded dynamic random-access memory.

6. The processing unit of claim 1, wherein the interface is further configured to couple the first internal memory to a display device.

7. The processing unit of claim 1, wherein the memory controller is configured to provide access to the memory cells.

8. The processing unit of claim 1, wherein the memory controller is coupled to a second memory controller of the additional processing unit.

9. The processing unit of claim 8, wherein the execution unit sends a request to the memory controller to retrieve data from the second internal memory.

10. The processing unit of claim 8, wherein the execution unit provides data to the memory controller to store in the second internal memory.

11. The processing unit of claim 1, wherein data in the second internal memory of the additional processing unit is accessed by the same mechanism as the first internal memory.

12. A computer-program product comprising a non-transitory computer-readable storage medium containing instructions that, when executed on a computing device, define a graphics-processing unit (GPU), wherein the GPU comprises:
   a first internal memory comprising a memory controller and memory cells;
   an execution unit coupled to the first internal memory, wherein the execution unit and the first internal memory are on a same die; and
   an interface configured to provide high bandwidth dedicated internal memory access to a second internal memory of an additional processing unit, and further configured to provide high bandwidth dedicated internal memory access to the first internal memory by the additional processing unit, the first internal memory being combinable with the second internal memory for general-purpose use by the additional processing unit.

13. The computer-program product of claim 12, wherein the additional processing unit comprises a GPU.

14. The computer-program product of claim 12, wherein the additional processing unit comprises a central processing unit (CPU) and the second internal memory is a cache memory.

15. The computer-program product of claim 12, wherein the first internal memory of the GPU comprises a stacked dynamic random-access memory.

16. The computer-program product of claim 12, wherein the first internal memory of the GPU comprises an embedded dynamic random-access memory.

17. The computer-program product of claim 12, wherein the GPU embodied in hardware description language software.

18. The computer-program product of claim 12, wherein the GPU is embodied in one of Verilog hardware description language software, Verilog-A hardware description language software, and VHDL hardware description language software.

19. A system, comprising:
   a first graphics-processing unit (GPU) comprising a first internal memory comprising a first memory controller and first memory cells, and a first execution unit coupled to the first internal memory, wherein the first execution unit and the first internal memory are on a first same die;
   a second GPU comprising a second internal memory comprising a second memory controller and second memory cells, and a second execution unit coupled to the second internal memory, wherein the second execution unit and the second internal memory are on a second same die; and
   an interface configured to provide high bandwidth dedicated internal memory access to the second internal memory by the first GPU, and further configured to provide high bandwidth dedicated internal memory access to the first internal memory by the second GPU, the first internal memory being combinable with the second internal memory for general-purpose use by the second GPU.

20. The system of claim 19, wherein the first internal memory comprises a stacked dynamic random-access memory.

21. The system of claim 19, wherein the first internal memory comprises an embedded dynamic random-access memory.

22. The system of claim 19, wherein the interface is further configured to couple the first internal memory and the second internal memory to a display device.

23. The system of claim 19, further comprising:
   an external memory;
   a central-processing unit (CPU) comprising a cache memory; and
   a bus coupled between the external memory and the CPU.

24. The system of claim 23, wherein the first GPU further comprises an additional interface configured to provide high bandwidth dedicated internal memory access to the cache memory of the CPU, and further to provide high bandwidth dedicated internal memory access to the first internal memory by the CPU.

25. The system of claim 23, wherein the second GPU further comprises an additional interface configured to provide high bandwidth dedicated internal memory access to the cache memory of the CPU, and further to provide high bandwidth dedicated internal memory access to the second internal memory by the CPU.

* * * * *